United States Patent
Friour et al.

(10) Patent No.: US 7,858,160 B2
(45) Date of Patent: *Dec. 28, 2010

(54) INKJET RECORDING ELEMENT

(75) Inventors: Gérard A. Friour, Chalon-sur-Saône (FR); Olivier J. Poncelet, Chalon-sur-Saône (FR)

(73) Assignee: Eastman Kodak Company, Rochester, NY (US)

( * ) Notice: Subject to any disclaimer, the term of this patent is extended or adjusted under 35 U.S.C. 154(b) by 1320 days.

This patent is subject to a terminal disclaimer.

(21) Appl. No.: 10/563,693

(22) PCT Filed: Jul. 2, 2004

(86) PCT No.: PCT/EP2004/007183

§ 371 (c)(1),
(2), (4) Date: Jan. 5, 2006

(87) PCT Pub. No.: WO2005/014299

PCT Pub. Date: Feb. 17, 2005

(65) Prior Publication Data

US 2006/0165921 A1 Jul. 27, 2006

(30) Foreign Application Priority Data

Jul. 18, 2003 (FR) .................... 03 08848

(51) Int. Cl.
*B41M 5/40* (2006.01)
(52) U.S. Cl. .................... 428/32.1; 428/32.34
(58) Field of Classification Search ........ None
See application file for complete search history.

(56) References Cited

U.S. PATENT DOCUMENTS 6,548,149 B1 * 4/2003 Liu et al. ............ 428/195.1

2001/0009712 A1 * 7/2001 Totani et al. ............ 428/195

FOREIGN PATENT DOCUMENTS

| EP | 976571 | 2/2000 |
| EP | 1162076 | 9/2002 |
| WO | WO 2004009368 A1 * | 1/2004 |

OTHER PUBLICATIONS

Graziano, Size dependence of the solubility of non-polar . . . Canadian J of Chemistry vol. 80, p. 401-412.*

* cited by examiner

*Primary Examiner*—D. Lawrence Tarazano
*Assistant Examiner*—Gregory Clark
(74) *Attorney, Agent, or Firm*—J. Jeffrey Hawley; Andrew J. Anderson

(57) ABSTRACT

The present invention relates to an inkjet recording element having very good dye keeping properties in time. Said inkjet recording element comprises a support and at least one ink-receiving layer, said ink-receiving layer comprising at least one hydrosoluble binder and at least one aluminosilicate polymer obtainable by a preparation method consisting in treating an aluminum halide with a mixture of at least one silicon alkoxide only having hydrolyzable substituents and at least one silicon alkoxide having a non-hydrolyzable substituent, with an aqueous alkali in the presence of silanol groups, the aluminum concentration being maintained less than 0.3 mol/l, the Al/Si molar ratio being maintained between 1 and 3.6 and the alkali/Al molar ratio being maintained between 2.3 and 3; and then stirring the resulting mixture at ambient temperature in the presence of silanol groups for long enough to form the hybrid aluminosilicate polymer. The ink-receiving layer also comprises inorganic particles.

18 Claims, 1 Drawing Sheet

INKJET RECORDING ELEMENT

FIELD OF THE INVENTION

The present invention relates to an inkjet recording element.

BACKGROUND OF THE INVENTION

Digital photography has been growing fast for several years and the general public now has access to efficient and reasonably priced digital cameras. Therefore people are seeking to be able to produce photographic prints from a simple computer and its printer, with the best possible quality.

Many printers, especially those linked to personal office automation, use the inkjet printing technique. There are two major families of inkjet printing techniques: continuous jet and drop-on-demand.

Continuous jet is the simpler system. Pressurized ink ($3 \cdot 10^5$ Pa) is forced to go through one or more nozzles so that the ink is transformed into a flow of droplets. In order to obtain the most regular possible sizes and spaces between drops, regular pressure pulses are sent using for example a piezoelectric crystal in contact with the ink having a high frequency (up to 1 MHz) alternating current power supply. So that a message can be printed using a single nozzle, every drop must be individually controlled and directed. Electrostatic energy is used for this: an electrode is placed around the ink jet at the place where drops form. The jet is charged by induction and every drop henceforth carries a charge whose value depends on the applied voltage. The drops then pass between two deflecting plates charged with the opposite sign and then follow a given direction, the amplitude of the movement being proportional to the charge carried by each of them. To prevent other drops from reaching the paper, they are left uncharged: so, instead of going to the support they continue their path without being deflected and go directly into a container. The ink is then filtered and can be reused.

The other category of inkjet printer is drop-on-demand (DOD). This constitutes the base of inkjet printers used in office automation. With this method, the pressure in the ink cartridge is not maintained constant but is applied when a character has to be formed. In one widespread system there is a row of 12 open nozzles, each of them being activated with a piezoelectric crystal. The ink contained in the head is given a pulse: the piezo element contracts with an electric voltage, which causes a decrease of volume, leading to the expulsion of the drop by the nozzle. When the element resumes its initial shape, it pumps in the reservoir the ink necessary for new printings. The row of nozzles is thus used to generate a column matrix, so that no deflection of the drop is necessary. One variation of this system consists in replacing the piezoelectric crystals by small heating elements behind each nozzle. The drops are ejected following the forming of bubbles of solvent vapor. The volume increase enables the expulsion of the drop. Finally, there is a pulsed inkjet system in which the ink is solid at ambient temperature. The print head thus has to be heated so that the ink liquefies and can print. This enables rapid drying on a wider range of products than conventional systems.

There now exist new "inkjet" printers capable of producing photographic images of excellent quality. However, they cannot supply good proofs if inferior quality printing paper is used. The choice of printing paper is fundamental for the quality of obtained image. The printing paper must combine the following properties: high quality printed image, rapid drying after printing, good dye keeping in time, smooth appearance, and high gloss.

In general, the printing paper comprises a support coated with one or more layers according to the properties required. It is possible, for example, to apply on a support a primary attachment layer, an absorbent layer, an ink-fixing layer and a protective layer or surface layer to provide the glossiness of the recording element. The absorbent layer absorbs the liquid part of the water-based ink composition after creation of the image. Elimination of the liquid reduces the risk of ink migration to the surface. The ink fixing layer prevents any ink loss into the fibers of the paper base to obtain good color saturation while preventing excess ink that would encourage the increase in size of the printing dots and reduce the image quality. The absorbent layer and fixing layer can also constitute a single ink-receiving layer ensuring both functions. The protective layer is designed to ensure protection against fingerprints and the pressure marks of the printer feed rollers. The ink-receiving layer usually comprises a binder, a receiving agent and various additives. The purpose of the receiving agent is to fix the dyes in the printing paper. The best-known inorganic receivers are colloidal silica or boehmite. For example, European Patent Applications EP-A-976,571 and EP-A-1,162,076 describe materials for inkjet printing in which the ink-receiving layer contains as inorganic receivers Ludox™ CL (colloidal silica) marketed by Grace Corporation or Dispal™ (colloidal boehmite) marketed by Sasol. However, printing paper comprising an ink-receiving layer containing such inorganic receivers can have poor image stability in time, which is demonstrated by a loss of color density.

To meet the new requirements of the market in terms of photographic quality, printing speed and color stability, it is necessary to offer a new inkjet recording element having the properties as defined above, more particularly good dye keeping properties in time as well as a high gloss.

SUMMARY OF THE INVENTION

The new inkjet recording element according to the present invention comprises a support and at least one ink-receiving layer comprising at least one hydrosoluble binder and at least one hybrid aluminosilicate polymer obtainable by a preparation method that comprises the following steps:

a) treating a mixed aluminum and silicon alkoxide of which the silicon has both hydrolyzable substituents and a non-hydrolyzable substituent, or a mixed aluminum and silicon precursor resulting from the hydrolysis of a mixture of aluminum compounds and silicon compounds only having hydrolyzable substituents and silicon compounds having a non-hydrolyzable substituent, with an aqueous alkali, in the presence of silanol groups, the aluminum concentration being maintained at less than 0.3 mol/l, the Al/Si molar ratio being maintained between 1 and 3.6 and the alkali/Al molar ratio being maintained between 2.3 and 3;

b) stirring the mixture resulting from step a) at ambient temperature in the presence of silanol groups long enough to form the hybrid aluminosilicate polymer; and c) eliminating the byproducts formed during steps a) and b) from the reaction medium, wherein the ink-receiving layer also comprises inorganic particles. These inorganic particles are based on metal oxide or metal hydroxide. They can be based on alumina, silica, titanium, zirconium, or their mixtures, such as the boehmites, fumed aluminas, colloidal silicas, fumed silicas, calcium silicates, magnesium silicates, zeolites, kaolin, bentonite, silicon dioxide, and titanium dioxide. The inorganic particles used can also be based on calcium carbonates, or barium carbonates.

Throughout the present description, the expression "non-hydrolyzable substituent" means a substituent that does not separate from the silicon atom during the process and in particular at the time of treatment with the aqueous alkali. Such substituents are for example hydrogen, fluoride or an organic group. On the contrary, the expression "hydrolyzable substituent" means a substituent eliminated by hydrolysis in the same conditions.

In the following, the expression "modified mixed aluminum and silicon alkoxide" means a mixed aluminum and silicon alkoxide in which the aluminum atom only has hydrolyzable substituents and the silicon atom has both hydrolyzable substituents and a non-hydrolyzable substituent.

Similarly, the expression "modified mixed aluminum and silicon precursor" means a precursor obtained by hydrolysis of a mixture of aluminum compounds and silicon compounds only having hydrolyzable substituents and silicon compounds having a non-hydrolyzable substituent. This is the non-hydrolyzable substituent that will be found again in the hybrid aluminosilicate polymer material useful in the present invention.

More generally, an "unmodified" compound is a compound that only consists of hydrolyzable substituents and a "modified" compound is a compound that consists of a non-hydrolyzable substituent.

The addition of inorganic particles into the element according to the invention enables the quantity of hybrid aluminosilicate polymer used in the receiving layer to be reduced, while obtaining an element having improved dye keeping in time as well as a good gloss compared with inkjet recording elements available on the market.

DETAILED DESCRIPTION OF THE INVENTION

Figure 1:
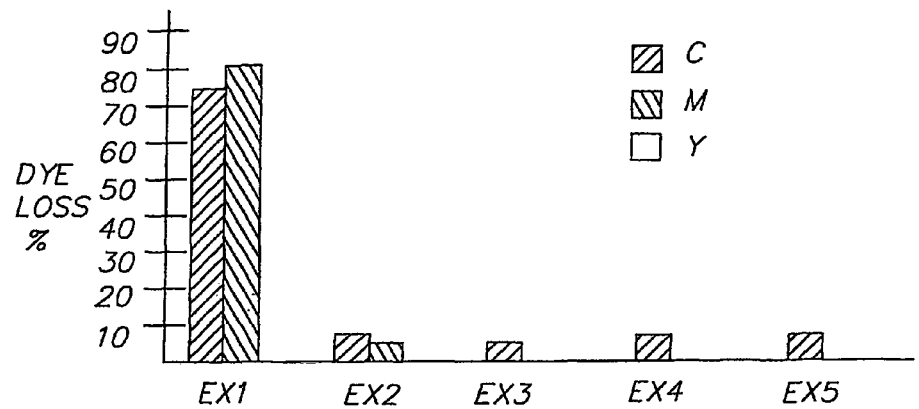
FIG. 1 represents the percentage of color density loss for various comparative recording elements and according to the present invention when exposed to ozone.

The inkjet recording element according to the present invention comprises firstly a support. This support is selected according to the desired use. It can be a transparent or opaque thermoplastic film, in particular a polyester based film; cellulose derivatives, such as cellulose ester, cellulose triacetate, cellulose diacetate; polyacrylates; polyimides; polyamides; polycarbonates; polystyrenes; polyolefines; polysulfones; polyetherimides; vinyl polymers such as polyvinyl chloride; and their mixtures. The support used in the invention can also be paper, both sides of which may be covered with a polyethylene layer. When the support comprising the paper pulp is coated on both sides with polyethylene, it is called Resin Coated Paper (RC Paper) and is marketed under various brand names. This type of support is especially preferred to constitute an inkjet recording element. The side of the support that is used can be coated with a very thin layer of gelatin or another composition to ensure the adhesion of the first layer on the support. To improve the adhesion of the ink-receiving layer on the support, the support surface can also have been subjected to a preliminary treatment by Corona discharge before applying the ink-receiving layer.

The inkjet recording element according to the invention then comprises at least one ink-receiving layer comprising at least one hydrosoluble binder. Said hydrosoluble binder can be a hydrophilic polymer such as polyvinyl alcohol, poly (vinyl pyrrolidone), gelatin, cellulose ethers, poly(oxazolines), poly(vinylacetamides), poly(vinyl acetate/vinyl alcohol) partially hydrolyzed, poly(acrylic acid), poly (acrylamide), sulfonated or phosphated polyesters and polystyrenes, casein, zein, albumin, chitin, dextran, pectin, derivatives of collagen, agar-agar, guar, carragheenane, tragacanth, xanthan and others. Preferably, one uses gelatin or polyvinyl alcohol. The gelatin is that conventionally used in the photographic field. Such a gelatin is described in Research Disclosure, September 1994, No. 36544, part IIA. *Research Disclosure* is a publication of Kenneth Mason Publications Ltd., Dudley House, 12 North Street, Emsworth, Hampshire PO10 7DQ, United Kingdom. The gelatin can be obtained from SKW and the polyvinyl alcohol from Nippon Gohsei, or Air Product with the name Airvol® 130.

The ink-receiving layer comprises, as receiving agent, at least one hybrid aluminosilicate polymer obtainable by a preparation method comprising the following steps:

a) treating a mixed aluminum and silicon alkoxide of which the silicon has both hydrolyzable substituents and a non-hydrolyzable substituent, or a mixed aluminum and silicon precursor resulting from the hydrolysis of a mixture of aluminum compounds and silicon compounds only having hydrolyzable substituents and silicon compounds having a non-hydrolyzable substituent, with an aqueous alkali, in the presence of silanol groups, the aluminum concentration being maintained at less than 0.3 mol/l, the Al/Si molar ratio being maintained between 1 and 3.6 and the alkali/Al molar ratio being maintained between 2.3 and 3;

b) stirring the mixture resulting from step a) at ambient temperature in the presence of silanol groups long enough to form the hybrid aluminosilicate polymer; and c) eliminating the byproducts formed during steps a) and b) from the reaction medium.

This hybrid aluminosilicate polymer, described in French Patent Application FR 02/9086, enables inkjet recording element to be produced having very good gloss and image stability properties.

According to one embodiment, the modified mixed aluminum and silicon precursor is formed in situ by mixing in aqueous medium (i) one compound selected from the group consisting of aluminum salts, aluminum alkoxides and aluminum halogenoalkoxides and (ii) at least one compound selected from the group consisting of unmodified silicon alkoxides and chloroalkoxides, and (iii) at least one compound selected from the group consisting of modified silicon alkoxides and chloroalkoxides.

The modified or unmodified alkoxide radical of the aluminum compound or silicon compound preferably contains 1 to 5 carbon atoms, such as methoxide, ethoxide, n-propoxide, or i-propoxide.

Preferably, an aluminum salt is used, such as a halide (e.g. chloride or bromide), a perhalogenate, a sulfate, a nitrate, a phosphate or a carboxylate. An aluminum halide, such as chloride, is particularly preferred.

Preferably, silicon compounds are used in the form of alkoxides.

A single unmodified silicon alkoxide or a mixture of unmodified silicon alkoxides, or a single unmodified silicon chloroalkoxide or a mixture of unmodified silicon chloroalkoxides, or a mixture of unmodified silicon alkoxides and chloroalkoxides can be used. Similarly, a single modified silicon alkoxide or a mixture of modified silicon alkoxides, or a single modified silicon chloroalkoxide or a mixture of modified silicon chloroalkoxides, or a mixture of modified silicon alkoxides and chloroalkoxides can be used.

Preferably, a mixture (i) of an aluminum halide and (ii) a mixture with at least one unmodified silicon alkoxide and at least one modified silicon alkoxide is produced.

An unmodified silicon alkoxide can be represented by the formula Si—(OR)$_4$, and a modified silicon alkoxide can be represented by the formula R'—Si—(OR)$_3$, wherein R represents an alkyl group comprising 1 to 5 carbon atoms R' represents H, F, or a substituted or unsubstituted linear or branched alkyl or alkenyl group, comprising 1 to 8 carbon atoms, e.g. a methyl, ethyl, n-propyl, n-butyl, 3-chloropropyl group, or a vinyl group.

Preferably, the unmodified silicon alkoxide is tetramethyl or tetraethyl orthosilicate, and the modified silicon alkoxide is methyltriethoxysilane or vinyltriethoxysilane.

The ratio of unmodified silicon alkoxide to modified silicon alkoxide is between 0.1 and 10 in moles of silicon, and is preferably about 1.

In practice, the unmodified silicon alkoxide and modified silicon alkoxide mixture is first produced pure or diluted in a co-solvent such as an alcohol. Said alcohol is preferably ethanol, used in sufficient amount to obtain a clear homogeneous mixture once the silicon compounds are mixed with the aluminum compound. Then, this mixture is added to the aluminum salt in aqueous solution, with stirring, at ambient temperature between 15° C. and 35° C., preferably between 20° C. and 25° C., until a clear homogeneous mixture is obtained. A modified mixed aluminum and silicon precursor is thus obtained. The stirring time varies from 10 to 240 minutes, and is preferably 120 minutes.

According to step a) of the method for preparing the hybrid aluminosilicate polymer useful in the invention, the precursor or a modified mixed aluminum and silicon alkoxide is then put in contact with an aqueous alkali, the aluminum concentration being maintained at less than 0.3 mol/l, the Al/Si molar ratio being maintained between 1 and 3.6, and the alkali/Al molar ratio being maintained between 2.3 and 3. Advantageously, the aluminum concentration is between $1.4 \times 10^{-2}$ and 0.3 mol/l and even more preferably between $4.3 \times 10^{-2}$ and 0.3 mol/l. Preferably, the Al/Si molar ratio is between 1 and 2.

Preferably, an aqueous solution of sodium, potassium or lithium hydroxide, with a concentration between 0.5 M and 3 M, and preferably 3 M is used. The alkali can also be in the form of an hydroalcoholic solution.

The alkali is added to the precursor or to the modified mixed aluminum and silicon alkoxide at a rate preferably between 50 and 650 mmoles/hour.

The alkali in step a) is added in the presence of silanol groups. These groups can be supplied by glass or silica (glass wool) particles or beads, which have superficial hydroxy groups. When the volume of liquid to be treated is large, it may be desirable to increase the quantity of beads. The diameter of the beads can be between 0.2 and 5 mm and preferably between 1 and 3 mm. To simplify the implementation of the method for preparing the hybrid aluminosilicate polymer used in the present invention, the preparation of the mixed aluminum and silicon precursor can also be performed in the presence of silanol groups, for example by circulating the mixture in a bed of glass beads.

After the addition of the alkali, step b) of the method for preparing the hybrid aluminosilicate polymer used in the present invention consists in stirring the mixture resulting from step a) at ambient temperature in the presence of silanol groups long enough to form the said hybrid aluminosilicate polymer.

Then, step c) of the method for preparing the hybrid aluminosilicate polymer useful in the present invention consists in eliminating from the reaction medium the byproducts formed during steps a) and b), such as the residual ions coming essentially from the alkali used in step a). The residual ions can be eliminated by washing, by successive sedimentations or by diafiltration. The hybrid aluminosilicate polymer material resulting from step c) can then be concentrated by centrifugation or nanofiltration. The introduction of non-hydrolyzable substituents, such as organic functions, enables providing for example an organophilic character to the resulting hybrid aluminosilicate polymers.

In a first embodiment of the method for preparing the hybrid aluminosilicate polymer useful in the present invention, during step a) a quantity of alkali is added in order to obtain an alkali/Al molar ratio of about 2.3. In this case the pH is maintained between 4 and 5, and preferably between 4.2 and 4.3. Then step b) as described above is applied. The hybrid aluminosilicate polymer used in the present invention is thus obtained in dispersion form. Step c) to eliminate the residual ions can then be performed by diafiltration, followed by nanofiltration concentration.

In a second embodiment of the method for preparing the hybrid aluminosilicate polymer used in the present invention, during step a) a quantity of alkali is added in order to obtain an alkali/Al molar ratio of about 3. Then step b) as described above is applied. The hybrid aluminosilicate polymer useful in the present invention is thus obtained in suspension form. Step c) to eliminate the residual ions can then be performed by diafiltration, followed by nanofiltration concentration, the hybrid aluminosilicate polymer having been previously redispersed by adding acid, such as hydrochloric or acetic acid or a mixture thereof.

In a third embodiment, the method for preparing the hybrid aluminosilicate polymer useful in the present invention comprises an additional step d), after step b) and before step c). Said step d) consists in adding in a few minutes an additional quantity of aqueous alkali to reach an alkali/Al molar ratio of 3 if this ratio had not already been reached during step a). The hybrid aluminosilicate polymer useful in the present invention is thus obtained in suspension form. Step c) to eliminate the residual ions can then be performed by diafiltration, followed by nanofiltration concentration, the hybrid aluminosilicate polymer having been previously redispersed by adding hydrochloric acid. Step c) can also be performed by washing with osmosed water by successive sedimentations, followed by centrifugation concentration.

The hybrid aluminosilicate polymer useful in the present invention resulting from step c) followed by concentration has physical gel form. The Al/Si molar ratio is between 1 and 3.6. Subsequent lyophilization enables the hybrid aluminosilicate polymer useful in the present invention to be obtained in powder form. Such a hybrid aluminosilicate polymer can be characterized in that its Raman spectrum comprises in spectral region 200 cm$^{-1}$ to 600 cm$^{-1}$ a wide band at 250±5 cm$^{-1}$, a wide intense band at 359±4 cm$^{-1}$, a shoulder at 407±7 cm$^{-1}$, and a wide band at 501±2 cm$^{-1}$, as well as bands corresponding to the silicon non-hydrolyzable substituent, bands linked to the silicon non-hydrolyzable substituent can be juxtaposed with other bands.

The Raman spectrum is produced for the resulting hybrid aluminosilicate polymer after step b) and before step c) and lyophilized.

According to the present invention, the ink-receiving layer also comprises inorganic particles. In one embodiment, said inorganic particles are based on metal oxide or metal hydroxide. Preferably, the inorganic particles are based on alumina, silica, titanium, zirconium, or their mixtures. Preferably, the inorganic particles are selected from among the group consisting of the boehmites, fumed aluminas, colloidal silicas, fumed silicas, calcium silicates, magnesium silicates, zeolites, kaolin, bentonite, silicon dioxide, and titanium dioxide. According to another embodiment, the inorganic particles are based on calcium carbonates, or barium carbonates.

Those skilled in the art know that such inorganic particles, used as a receiving agent in ink-receiving layers, do not enable the required image stability nor gloss to be obtained for inkjet recording elements.

The quantity of inorganic particles is selected so that the addition the said inorganic particles in the ink-receiving layer enables the quantity of hybrid aluminosilicate polymer used to be reduced, while keeping the image stability and gloss properties obtained with this aluminosilicate polymer when it is used alone. The quantity of hybrid aluminosilicate polymer useful in the present invention, in the dry state, is between 5 and 80 percent by weight compared with the total dry inorganic mass, represented by the dry weight of the hybrid aluminosilicate polymer useful in the present invention and the inorganic particles. Preferably, the quantity of hybrid aluminosilicate polymer useful in the present invention in the dry state is between 5 and 50 percent by weight compared with the dry inorganics total weight. In a more preferred way, the quantity of hybrid aluminosilicate polymer useful in the present invention in the dry state is between 5 and 20 percent by weight compared with the dry inorganics total weight.

In the ink-receiving layer, the inorganic total dry weight (hybrid aluminosilicate polymer and inorganic particles) is between 5 and 95 percent of the total weight of the dry state ink-receiving layer. Preferably, the total dry inorganic weight is between 85 and 95 percent of the total weight of the dry receiving layer.

The present invention also relates to the composition intended to be coated on the support to constitute the ink-receiving layer of the inkjet recording element described above. To produce this composition, the hydrosoluble binder is diluted in water to adjust its viscosity and facilitate its coating. Preferably, one uses the hybrid aluminosilicate polymer useful in the present invention and the inorganic particles in the form of an aqueous solution. Preferably, the hybrid aluminosilicate polymer useful in the present invention and the inorganic particles are first mixed together and then the hydrosoluble binder is added. The composition then has the form of an aqueous solution or a dispersion containing all the necessary components.

The composition can also comprise a surfactant to improve its coating properties. The composition can be coated on the support according to any appropriate coating method, such as blade, knife or curtain coating. The composition is applied with a thickness between approximately 100 µm and 200 µm in the wet state. The composition forming the ink-receiving layer can be applied to both sides of the support. It is also possible to provide an antistatic or anti-winding layer on the back of the support coated with the ink-receiving layer.

The inkjet recording element according to the invention can comprise, besides the ink-receiving layer described above, other layers having another function, arranged above or below said ink-receiving layer. The ink-receiving layer as well as the other layers can comprise all the other additives known to those skilled in the art to improve the properties of the resulting image, such as UV ray absorbers, optical brightening agents, antioxidants, plasticizers, etc.

The ink-receiving layer useful in the present invention has a thickness generally between 5 µm and 50 µm in the dry state. The inkjet recording element comprising such an ink-receiving layer has improved dye keeping properties in time as well as a good gloss. It can be used for any type of inkjet printer as well as for all the inks developed for this technology.

The following examples illustrate the present invention without however limiting the scope.

1) Preparation of the Hybrid Aluminosilicate Polymer Useful in the Present Invention 4.53 moles $AlCl_3$, $6H_2O$ were added to 100 l osmosed water. Separately, a mixture of tetraethyl orthosilicate and methyltriethoxysilane was prepared in a quantity corresponding to 2.52 moles silicon and so as to have a ratio of tetraethyl orthosilicate to methyltriethoxysilane of 1 in moles silicon. This mixture was added to the aluminum chloride solution. The resulting mixture was stirred and circulated simultaneously through a bed formed of 1 kg glass beads 2-mm diameter using a pump with output 8 l/min. The operation of preparing the modified mixed aluminum and silicon precursor took 120 minutes. Then, according to step a) of the method for preparing the hybrid aluminosilicate polymer, 10.5 moles NaOH 3M were added in four hours. Aluminum concentration was $4.3 \times 10^{-2}$ mol/l, Al/Si molar ratio 1.8 and alkali/Al ratio 2.31. The reaction medium clouded. According to step b) of the preparation method, the mixture was stirred for 48 hours. The medium became clear. The circulation was stopped in the glass bead bed. The hybrid aluminosilicate polymer used in the present invention was thus obtained in dispersion form. Step c) of the method according to the invention consisted in performing preconcentration by a factor of 3 by nanofiltration, then diafiltration using a Filmtec NF 2540 nanofiltration membrane (surface area 6 $m^2$) to eliminate the sodium salts to obtain an Al/Na rate greater than 100. The retentate resulting from the diafiltration by nanofiltration was concentrated to obtain a gel with about 20 percent by weight of hybrid aluminosilicate polymer used in the present invention.

2) Preparation of Coating Compositions Constituting an Ink-Receiving Layer Coated on a Support As hydrosoluble binder, polyvinyl alcohol was used (Gohsenol™ GH23 marketed by Nippon Gohsei) diluted to 9 percent in osmosis water.

The powder of the hybrid aluminosilicate polymer prepared according to Example 1 was used to prepare a solution of hybrid aluminosilicate polymer useful in the present invention at 16.66 percent in de-ionized water.

The inorganic particles used are given below in Table I:

TABLE I

| Inorganic particles | Brand | Supplier |
|---|---|---|
| Fumed alumina (dispersion at 40 percent) | CAB-O-SPERSE ® PG003 | Cabot Corporation |
| Colloidal silica (dispersion at 40 percent) | Ondeo Nalco ® 2329 | Ondeo Nalco Corporation |

First various mixtures were made of the hybrid aluminosilicate polymer and inorganic particles comprising 0 to 100 percent of hybrid aluminosilicate polymer by weight compared with the total dry inorganic weight, in a glass flask including five 10-mm diameter glass beads for 50 g of mixture. The mixture was stirred for two hours by a roller stirrer. Then the polyvinyl alcohol was added and stirred for 12 hours using a roller stirrer.

Composition 1 (comp.)
Composition 1 was prepared by mixing 10.5 g de-ionized water, 7.5 g fumed alumina dispersion, 4 g polyvinyl alcohol 9 percent.

Composition 2 (Inv.)
Composition 2 was prepared in the same way as composition 1 by replacing 1.5 g fumed alumina dispersion by 3.6 g solution of hybrid aluminosilicate polymer. The weight ratio of hybrid aluminosilicate polymer/inorganic particles was 20/80. The quantity of de-ionized water was adjusted so as to keep the same concentration of dry matter as composition 1.

Composition 3 (Inv.)
Composition 3 was prepared in the same way as composition 1 by replacing 3.75 g fumed alumina dispersion by 9 g solution of hybrid aluminosilicate polymer. The weight ratio of hybrid aluminosilicate polymer/inorganic particles was 50/50. The quantity of de-ionized water was adjusted so as to keep the same concentration of dry matter as composition 1.

Composition 4 (Inv.)
Composition 4 was prepared in the same way as composition 1 by replacing 6 g fumed alumina dispersion by 14.4 g solution of hybrid aluminosilicate polymer. The weight ratio of hybrid aluminosilicate polymer/inorganic particles was 80/20. The quantity of de-ionized water was adjusted so as to keep the same concentration of dry matter as composition 1.

Composition 5 (Comp.)
Composition 5 was prepared in the same way as composition 1 by replacing all the fumed alumina dispersion by 18 g solution of hybrid aluminosilicate polymer. The quantity of de-ionized water was adjusted so as to keep the same concentration of dry matter as composition 1.

Composition 6 (comp.)
Composition 6 was prepared by mixing 10.5 g de-ionized water, 7.5 g colloidal silica dispersion, 4 g polyvinyl alcohol 9 percent.

Composition 7 (Inv.)
Composition 7 was prepared in the same way as composition 6 by replacing 0.375 g colloidal silica dispersion by 0.9 g solution of hybrid aluminosilicate polymer. The weight ratio of hybrid aluminosilicate polymer/inorganic particles was 5/95. The quantity of de-ionized water was adjusted so as to keep the same concentration of dry matter as composition 6.

Composition 8 (Inv.)
Composition 8 was prepared in the same way as composition 6 by replacing 0.937 g colloidal silica dispersion by 2.25 g solution of hybrid aluminosilicate polymer. The weight ratio of hybrid aluminosilicate polymer/inorganic particles was 12.5/87.5. The quantity of de-ionized water was adjusted so as to keep the same concentration of dry matter as composition 6.

Composition 9 (Inv.)
Composition 9 was prepared in the same way as composition 6 by replacing 1.5 g colloidal silica dispersion by 3.6 g solution of hybrid aluminosilicate polymer. The weight ratio of hybrid aluminosilicate polymer/inorganic particles was 20/80. The quantity of de-ionized water was adjusted so as to keep the same concentration of dry matter as composition 6.

3) Preparation of Inkjet Recording Elements

To do this, a Resin Coated Paper type support was placed on a coating machine, first coated with a very thin gelatin layer, and held on the coating machine by vacuum. This support was coated with a composition as prepared according to Paragraph 2 using a 200-µm thick filmograph. Then, it was left to dry in the atmosphere (21° C.) to obtain a dry layer about 15 g/m².

The resulting recording elements correspond to the examples given in Table II below by specifying the inorganic particles added to the hybrid aluminosilicate polymer used in the ink-receiving layer, and the hybrid aluminosilicate polymer/inorganic particles weight ratio:

TABLE II

| Recording element | Inorganic particles added to the ink-receiving layer | Hybrid aluminosilicate/ inorganic particles weight ratio |
|---|---|---|
| Ex. 1 (comp.) | Fumed alumina CAB-O-SPERSE ® PG003 | 0/100 |
| Ex. 2 (inv.) | Fumed alumina CAB-O-SPERSE ® PG003 | 20/80 |
| Ex. 3 (inv.) | Fumed alumina CAB-O-SPERSE ® PG003 | 50/50 |
| Ex. 4 (inv.) | Fumed alumina CAB-O-SPERSE ® PG003 | 80/20 |
| Ex. 5 (comp.) | — | 100/0 |
| Ex. 6 (comp.) | Colloidal silica Nalco 2329 | 0/100 |
| Ex. 7 (inv.) | Colloidal silica Nalco 2329 | 5/95 |
| Ex. 8 (inv.) | Colloidal silica Nalco 2329 | 12.5/87.5 |
| Ex. 9 (inv.) | Colloidal silica Nalco 2329 | 20/80 |

4) Evaluation of Dye Keeping Properties in Time and Evaluation of Gloss

To evaluate the dye keeping properties in time, a dye fading test by exposure to ozone was performed for each resulting recording element. To do this, targets, comprising three colors (yellow, cyan and magenta) were printed on each recording element using a KODAK PPM 200 printer and related ink. The targets were analyzed using a GretagMacbeth™ Spectrolino spectrophotometer that measured the intensity of the various colors. Then the recording elements were placed to the dark in a room with controlled ozone atmosphere (60 ppb) for three weeks. Each week, any degradation of the color density was monitored using the spectrophotometer.

The gloss was measured for various resulting recording elements using a Picogloss 560 apparatus (60° geometry) marketed by Erichsen.

FIG. 1 represents the percentage of density loss observed for the maximum density for the three colors of the targets after one week for examples 1 to 5. The letters C, M and Y represent the colors cyan, magenta and yellow respectively.

It may be seen that the inkjet recording element according to the invention (Ex. 2 to 4) have dye keeping properties in time very superior to that observed for the element only containing inorganic particles as receiving agents (Ex. 1). The recording elements according to the invention are almost stable for all the colors. While they comprise a quantity of hybrid aluminosilicate polymer less than the recording element of Example 5, the recording elements of the invention enable color stability to be obtained similar to that of the element only containing hybrid aluminosilicate polymer as receiving agent. The addition of inorganic particles, such as fumed alumina, enables the quantity of hybrid aluminosilicate polymer useful in the invention to be reduced while keeping the image stability properties obtained by this hybrid aluminosilicate polymer when used alone.

Figure 2:
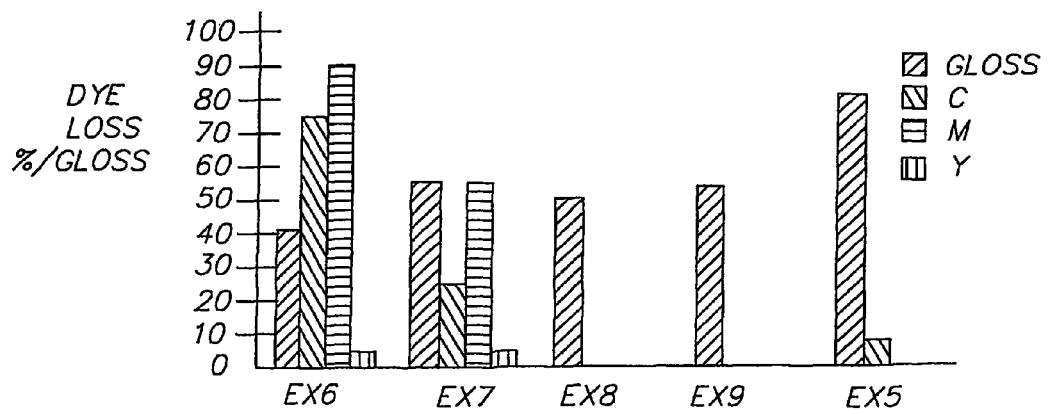
FIG. 2 represents the gloss and the percentage of color density loss for various comparative recording elements and according to the present invention when exposed to ozone.

FIG. 2 represents the gloss as well as the percentage of density loss observed for the maximum density for the three colors of the targets after three weeks for examples 5, 6 to 9. Here again, FIG. 2 clearly shows that the recording elements according to the invention (Ex. 7 to 9) have better dye keeping properties than the recording element only containing inorganic particles (Ex. 6). The gloss of the recording elements according to the invention is also superior to that of the recording element only containing inorganic particles. In particular, the recording elements according to Examples 8 and 9, while they contain a quantity of hybrid aluminosilicate polymer less than the recording element of Example 5, enable a gloss and color stability to be obtained similar to those of the element only containing the hybrid aluminosilicate polymer. The addition of colloidal silica enables the quantity of hybrid aluminosilicate polymer useful in the invention to be reduced while keeping the image stability and gloss properties obtained by this hybrid aluminosilicate polymer when used alone.

The invention claimed is:

1. An inkjet recording element comprising a support and at least one ink-receiving layer comprising at least one hydrosoluble binder and at least one hybrid aluminosilicate polymer obtainable by a preparation method that comprises the following steps:
    a) treating a mixed aluminum and silicon alkoxide of which the silicon has both hydrolyzable substituents and a non-hydrolyzable substituent, or a mixed aluminum and silicon precursor resulting from the hydrolysis of a mixture of aluminum compounds and silicon compounds only having hydrolyzable substituents and silicon compounds having a non-hydrolyzable substituent, with an aqueous alkali, in the presence of silanol groups, the aluminum concentration being maintained at less than 0.3 mol/l, the Al/Si molar ratio being maintained between 1 and 3.6 and the alkali/Al molar ratio being maintained between 2.3 and 3;
    b) stirring the mixture resulting from step a) at ambient temperature in the presence of silanol groups long enough to form the hybrid aluminosilicate polymer; and
    c) eliminating the byproducts formed during steps a) and b) from the reaction medium,
wherein the ink-receiving layer also comprises inorganic particles.

2. The recording element according to claim 1, wherein the inorganic particles are based on metal oxide or metal hydroxide.

3. The recording element according to claim 2, wherein the inorganic particles are based on alumina, silica, titanium, zirconium, or their mixtures.

4. The recording element according to claim 3, wherein the inorganic particles are selected from among the group consisting of the boehmites, fumed aluminas, colloidal silicas, fumed silicas, calcium silicates, magnesium silicates, zeolites, kaolin, bentonite, silicon dioxide, and titanium dioxide.

5. The recording element according to claim 1, wherein the inorganic particles are based on calcium carbonates or barium carbonates.

6. The recording element according to claim 1, wherein the ink-receiving layer comprises a quantity of hybrid aluminosilicate polymer in the dry state between 5 and 20 percent by weight compared with the total dry inorganic weight.

7. The recording element according to claim 1, wherein, in the ink-receiving layer, the total dry inorganic weight is between 5 and 95 percent of the total dry receiving layer weight.

8. The recording element according to claim 1, wherein the alkali of step a) to prepare the hybrid aluminosilicate polymer is selected from the group consisting of sodium, potassium, and lithium hydroxide.

9. The recording element according to claim 1, wherein the aluminum concentration used to prepare the hybrid aluminosilicate-polymer is maintained between $1.4 \times 10^{-2}$ and 0.3 mol/l.

10. The recording element according to claim 1, wherein said alkali/Al molar ratio to prepare the hybrid aluminosilicate polymer is about 2.3.

11. The recording element according to claim 1, wherein said mixed aluminum and silicon precursor resulting from hydrolysis of a mixture of aluminum compounds and silicon compounds only having hydrolyzable substituents and silicon compounds having a non-hydrolyzable substituent is a product resulting from the mixture in an aqueous medium (i) of a compound selected from the group consisting of aluminum salts, aluminum alkoxides and aluminum halogenoalkoxides and (ii) at least one compound selected from the group consisting of silicon alkoxides and chloroalkoxides only having hydrolyzable substituents, and (iii) at least one compound selected from the group consisting of silicon alkoxides and chloroalkoxides having a non-hydrolyzable substituent.

12. The recording element according to claim 11, wherein said mixed aluminum and silicon precursor is the product resulting from the mixture (i) of an aluminum halide and (ii) a mixture having at least one silicon alkoxide only having hydrolyzable substituents and at least one silicon alkoxide having a non-hydrolyzable substituent.

13. The recording element according to claim 12, wherein the ratio of silicon alkoxide only having hydrolyzable substituents to silicon alkoxide having a non-hydrolyzable substituent is between 0.1 and 10 in moles silicon.

14. The recording element according to any one of claim 11 to 13, wherein the silicon alkoxide having a non-hydrolyzable substituent is represented by the formula

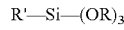

wherein R represents an alkyl group comprising 1 to 5 carbon atoms

R' represents H, F, or a substituted or unsubstituted linear or branched alkyl or alkenyl group comprising 1 to 8 carbon atoms.

15. The recording element according to claim 14, wherein R' represents a methyl, ethyl, n-propyl, n-butyl, 3-chloropropyl, or vinyl group.

16. The recording element according to claim 15, wherein said silicon alkoxide having a non-hydrolyzable substituent is methyltriethoxysilane or vinyltriethoxysilane.

17. The recording element according to claim 11, wherein said silicon alkoxide only having hydrolyzable substituents is tetramethyl orthosilicate or tetraethyl orthosilicate.

18. The recording element according to claim 1, wherein the hydrophilic binder is gelatin or polyvinyl alcohol.

* * * * *